(12) United States Patent
Okada et al.

(10) Patent No.: US 8,176,315 B2
(45) Date of Patent: May 8, 2012

(54) GATEWAY DEVICE, CONTROLLING METHOD OF THE SAME, AND PROGRAM RECORD MEDIUM STORING CONTROLLING METHOD

(75) Inventors: Kazuhiro Okada, Kyoto (JP); Shigeki Takeuchi, Kyoto (JP); Katsunori Ishiyama, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 955 days.

(21) Appl. No.: 12/116,298

(22) Filed: May 7, 2008

(65) Prior Publication Data

US 2008/0282078 A1 Nov. 13, 2008

(30) Foreign Application Priority Data

May 10, 2007 (JP) ................................ 2007-125360

(51) Int. Cl.
*H04L 29/06* (2006.01)
(52) U.S. Cl. ......... 713/153; 713/150; 358/402; 709/203
(58) Field of Classification Search .................. 713/150, 713/153; 358/402; 709/203
See application file for complete search history.

(56) References Cited

U.S. PATENT DOCUMENTS

| | | | | |
|---|---|---|---|---|
| 2002/0140986 A1* | 10/2002 | Takayama | .................... | 358/402 |
| 2003/0142364 A1* | 7/2003 | Goldstone | .................... | 358/402 |
| 2005/0289337 A1 | 12/2005 | Tanimoto | | |
| 2006/0053278 A1 | 3/2006 | Tanimoto et al. | | |
| 2006/0209868 A1* | 9/2006 | Callaghan | .................... | 370/428 |

FOREIGN PATENT DOCUMENTS

| | | | |
|---|---|---|---|
| JP | 04-296138 A | 10/1992 | |
| JP | 08-292920 A | 11/1996 | |
| JP | 11-088410 A | 3/1999 | |
| JP | 2000-031957 A | 1/2000 | |
| JP | 2004-023154 A | 1/2004 | |
| JP | 2004-199609 A | 7/2004 | |
| JP | 2005-107935 A | 4/2005 | |
| JP | 2006-080805 A | 3/2006 | |
| JP | 2006-244318 A | 9/2006 | |
| JP | 2007-087327 A | 4/2007 | |
| JP | 2007-140752 A | 6/2007 | |

OTHER PUBLICATIONS

Official Communication issued in corresponding Japanese Patent Application No. 2007-125360, mailed on Dec. 15, 2009.
Official communication issued in counterpart Japanese Application No. 2007-125360, mailed on Apr. 16, 2009.

* cited by examiner

*Primary Examiner* — David Pearson
*Assistant Examiner* — Angela Holmes
(74) *Attorney, Agent, or Firm* — Keating & Bennett, LLP (57) ABSTRACT

A method of controlling a gateway device includes the steps of converting a plain text mail received from a client device to an encrypted mail; transmitting the encrypted mail to a mail transmission server; and notifying a transmission error to the client device when the transmission error occurs between the gateway device and the mail transmission server is provided.

7 Claims, 5 Drawing Sheets

GATEWAY DEVICE, CONTROLLING METHOD OF THE SAME, AND PROGRAM RECORD MEDIUM STORING CONTROLLING METHOD

CROSS-REFERENCE TO RELATED APPLICATIONS

This application claims priority under 35 U.S.C. §119 to Japanese Patent Application No. 2007-125360, filed on May 10, 2007, which application is hereby incorporated by reference in its entirety.

BACKGROUND OF THE INVENTION

1. Field of the Invention

The present invention relates to a technique enabling, in a gateway device that encrypts and decrypts an e-mail, a transmitting/receiving client to safely use an e-mail encryption system, even if a transmission/reception error occurs between the gateway device and a mail transmission/reception server.

2. Description of the Related Art

Currently, information is frequently exchanged by e-mails. However, because transmission and reception of e-mails are carried out through unspecified communication paths, it is possible that the e-mail might be electrically intercepted or altered in the middle of the communication path. An e-mail encryption system that encrypts e-mails is being developed in order to enable the transmitting/receiving client to safely use the e-mail system.

A method for easily and conveniently using the e-mail encryption system includes a method of interposing a gateway device, which encrypts and decrypts e-mails, between a client device and a mail transmission/reception server. The gateway device also serves as an easy and convenient mail transmission/reception server.

However, a transmission error might occur when the gateway device transmits an encrypted mail to the mail transmission server. In this case, the transmitting client is unable to know about the transmission error. The transmitting client is then unable to transmit the encrypted mail to the destination, is unable to know about the transmission error, and thus cannot safely use the e-mail encryption system.

Reception error might occur when the gateway device receives an encrypted mail from the mail reception server. The gateway device might be able to receive at least one encrypted mail from the mail reception server in this case. However, if the communication between the gateway device and the client device also becomes an error, the receiving client cannot receive a plain text mail from the gateway device. The receiving client then cannot receive the plain text mail from the source and thus cannot safely use the e-mail encryption system.

SUMMARY OF THE INVENTION

In view of the above problems, preferred embodiments of present invention provide a technique enabling, in a gateway device which encrypts and decrypts an e-mail, a transmitting/receiving client to safely use an e-mail encryption system, even if a transmission/reception error occurs between the gateway device and the mail transmission/reception server.

In order to overcome the problems described above, preferred embodiments of the present invention provides a gateway device including a converting portion arranged to convert a plain text mail received from a client device to an encrypted mail and transmitting portions arranged to transmit the encrypted mail to a mail transmission server; the device also includes a transmission error notifying portions arranged to notify a transmission error to the client device when the transmission error occurs between the gateway device and the mail transmission server.

Furthermore, according to the preferred embodiments of the present invention, in the gateway device, the transmission error notifying portions includes a creating portion arranged to create a transmission error mail on the transmission error and arranged to store the transmission error mail to a mail box corresponding to a source which is a notifying destination of the transmission error and includes a distributing portion arranged to distribute the transmission error mail to the client device in response to a reception request from the client device.

The preferred embodiments of the present invention also provide a gateway device that includes a converting portion arranged to convert an encrypted mail received from a mail reception server to a plain text mail; a storing portion arranged to store the plain text mail in a mail box corresponding to a destination; and a reception request responding portions arranged to distribute the plain text mail to a client device in response to a reception request from the client device. The reception request responding portion includes a distributing portion arranged to distribute the plain text mail to the client device when at least one encrypted mail is received from the mail reception server, even if a reception error occurs between the gateway device and the mail reception server.

Furthermore, according to preferred embodiments of the present invention, there is included a reception error notifying portions arranged to notify a reception error to the client device when not even one encrypted mail is received from the mail reception server as a result of the reception error that occurs between the gateway device and the mail reception server.

Moreover, according to preferred embodiments of the present invention, in the gateway device, the reception error notifying portion includes a notifying portion arranged to notify a reception error to the client device by making a communication between the gateway device and the client device an error.

If a transmission error occurs when the gateway device transmits an encrypted mail to the mail transmission server, the gateway device can create an error mail regarding the transmission error. The client device then can receive the error mail regarding the transmission error. The transmitting client is then able to know about the transmission error.

The gateway device might be able to receive at least one encrypted mail from the mail reception server even if a reception error occurs when the gateway device receives an encrypted mail from the mail reception server. In this case, the gateway device does not make the communication between the gateway device and the client device as an error. The client device then can receive a plain text mail from the gateway device.

The gateway device might not be able to receive even one encrypted mail from the mail reception server as a result of the reception error that occurs when the gateway device receives an encrypted mail from the mail reception server. In this case, the gateway device can make the communication between the gateway device and the client device as an error. The receiving client is then able to know about the reception error.

According to the preferred embodiments of present invention, the transmitting/receiving client can safely use an e-mail encryption system, even if transmission/reception error occurs between the gateway device and the mail transmission/reception server.

Other features, elements, processes, steps, characteristics, and advantages of the present invention will become more apparent from the following detailed description of preferred embodiments of the present invention with reference to the attached drawings.

DETAILED DESCRIPTION OF PREFERRED EMBODIMENTS

Figure 1:
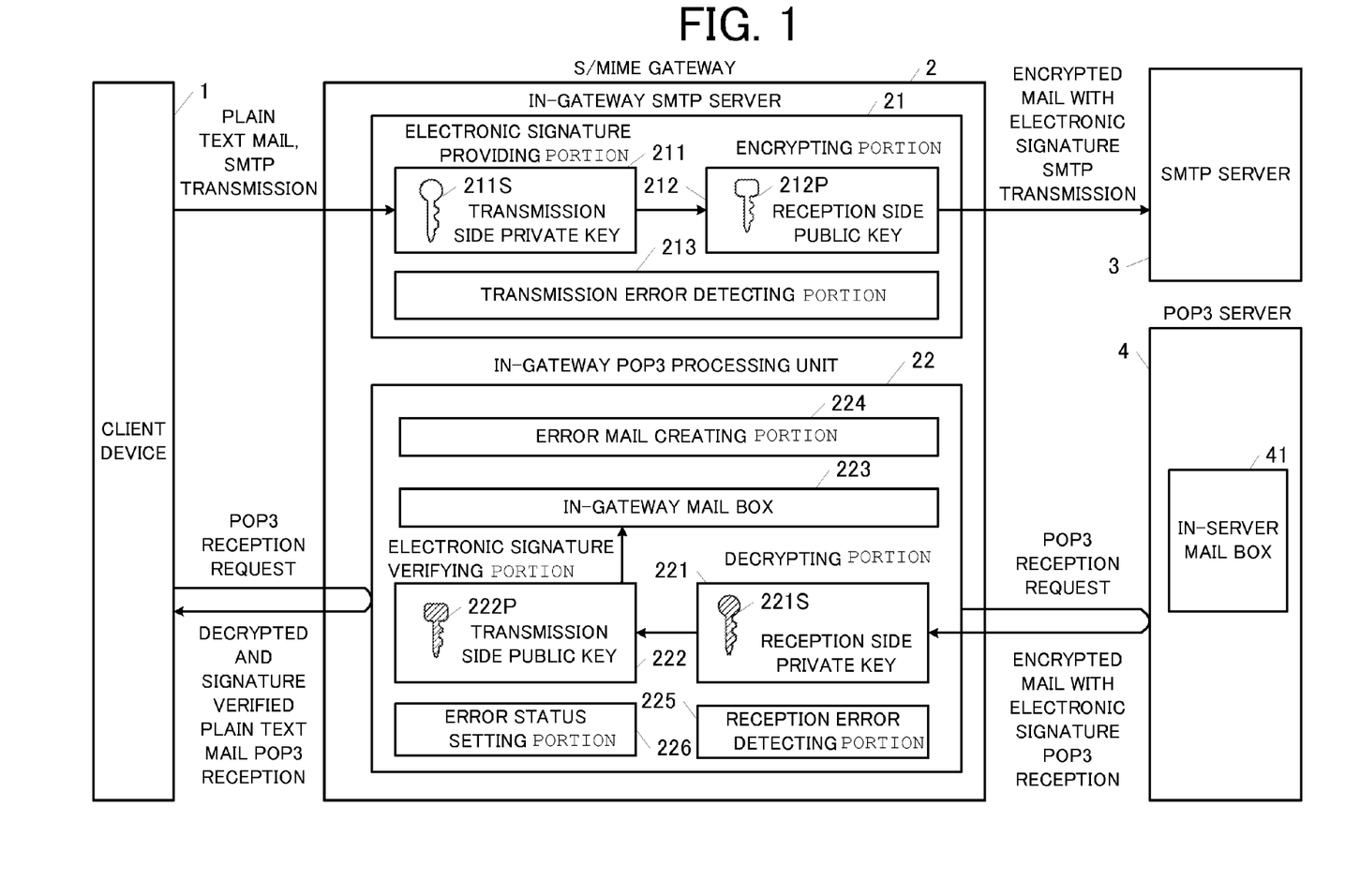
FIG. 1 is a block diagram showing a process flow for a client device to transmit/receive an e-mail according to a preferred embodiment of the present invention.

Preferred embodiments of the present invention will now be described with reference to the drawings. FIG. 1 is a block diagram showing a process flow for a client device to transmit/receive an e-mail. An e-mail encryption system shown in FIG. 1 includes a client device 1, an S/MIME gateway 2, an SMTP server 3, a POP3 server 4, and other similar components.

The client device 1 transmits a plain text mail to the S/MIME gateway 2. The client device 1 receives the decrypted and signature verified plain text mail from the S/MIME gateway 2. The client device 1 can be a personal computer, a digital multifunction peripheral, or similar component.

The S/MIME gateway 2 provides an electronic signature and performs encryption on the plain text mail received from the client device 1 and transmits the encrypted mail with the electronic signature to the SMTP server 3. The S/MIME gateway 2 also performs decryption and electronic signature verification on the encrypted mail with an electronic signature received from the POP3 server 4. The client device 1 receives the decrypted and signature verified plain text mail from the S/MIME gateway 2. The S/MIME gateway 2 is used in the present preferred embodiment, but a gateway using PGP or other similar security standard can be used.

The SMTP server 3 receives the encrypted mail with the electronic signature from the S/MIME gateway 2 and transmits the encrypted mail with the electronic signature to the destination. The POP3 server 4 receives the encrypted mail with the electronic signature from the source. The S/MIME gateway 2 receives the encrypted mail with the electronic signature from the POP3 server 4. The POP3 server 4 includes an in-server mail box 41. The SMTP server 3 and the POP3 server 4 are used in the present preferred embodiment, but other mail transmission/transmission servers can be used.

The S/MIME gateway 2 includes an in-gateway SMTP server 21, an in-gateway POP3 processing unit 22, and other similar components.

The in-gateway SMTP server 21 has a function of providing an electronic signature and performing encryption on the plain text received from the client device 1 and transmitting the encrypted mail with the electronic signature to the SMTP server 3. Thus, the in-gateway SMTP server 21 serves as the SMTP server in relation with the client device 1 and serves as the SMTP client in relation with the SMTP server 3.

The in-gateway POP3 processing unit 22 has a function of performing decryption and electronic signature verification on the encrypted mail with the electronic signature received from the POP3 server 4. The client device 1 receives the decrypted and signature verified plain text mail from the in-gateway POP3 processing unit 22. Thus, the in-gateway POP3 processing unit 22 serves as a POP3 server in relationship with the client device 1 and serves as a POP3 client in relationship with the POP3 server 4.

Because the SMTP server 3 and the POP3 server 4 are used in the present preferred embodiment, the S/MIME gateway 2 includes the in-gateway SMTP server 21, the in-gateway POP3 processing unit 22, and other similar components. However, if a different mail transmission/reception server is used, the S/MIME gateway 2 includes an in-gateway mail transmission/reception server and other components corresponding to the relevant mail transmission/reception server.

The in-gateway SMTP server 21 includes an electronic signature providing portion 211, an encrypting portion 212, a transmission error detecting portion 213, and other similar components.

The electronic signature providing portion 211 provides an electronic signature to the plain text mail received from the client device 1 and outputs the mail with the electronic signature to the encrypting portion 212. As a specific method for the electronic signature providing portion 211 to provide the electronic signature to the plain text mail, the electronic signature providing portion 211 preferably generates a message digest from the plain text mail using a message digest function. The electronic signature providing portion 211 then encrypts the message digest using a transmission side private key 211S.

The encrypting portion 212 encrypts the mail with the electronic signature input from the electronic signature providing portion 211 and transmits the encrypted mail with the electronic signature to the SMTP server 3. As a specific method for the encrypting portion 212 to encrypt the mail with the electronic signature, the encrypting portion 212 preferably generates an encrypted mail with the electronic signature from the mail with the electronic signature using a common key of the transmission/reception side. The encrypting portion 212 encrypts the common key of the transmission/reception side using a reception side public key 212P.

The transmission error detecting portion 213 detects a transmission error that occurs when the in-gateway SMTP server 21 transmits the encrypted mail with the electronic signature to the SMTP server 3. The transmission error detecting portion 213 then notifies an error mail creating portion 224 arranged in the in-gateway POP3 processing unit 22 that a transmission error has occurred.

The in-gateway POP3 processing unit 22 includes a decrypting portion 221, an electronic signature verifying portion 222, an in-gateway mail box 223, the error mail creating portion 224, a reception error detecting portion 225, an error status setting portion 226, and other similar components.

The decrypting portion 221 decrypts the encrypted mail with the electronic signature received from the POP3 server 4 and outputs the mail with the electronic signature to the electronic signature verifying portion 222. As a specific method for the decrypting portion 221 to decrypt the encrypted mail with the electronic signature, the decrypting portion 221 preferably decrypts the common key of the transmission/reception side using a reception side private key 221S. The decrypting portion 221 generates the mail with the electronic signature from the encrypted mail with the electronic signature using the common key of the transmission/reception side.

The electronic signature verifying portion 222 performs electronic signature verification on the mail with the electronic signature input from the decrypting portion 221 and stores the decrypted and signature verified plain text in the in-gateway mail box 223. As a specific method for the electron signature verifying portion 222 to perform electronic signature verification on the mail with the electronic signature, the electronic signature verifying portion 222 preferably decrypts the message digest using a transmission side public key 222P. The electronic signature verifying portion 222 newly generates a message digest from the plain text using the message digest function. The electronic signature verifying portion 222 compares the decrypted message digest with the newly generated message digest.

The in-gateway mail box 223 stores the decrypted and signature verified plain text mail generated in the electronic signature verifying portion 222. The in-gateway mail box 223 also stores an error mail 223E shown in FIG. 2 generated in the error mail generating portion 224. The client device 1 makes a reception request to the in-gateway POP3 processing unit 22 and receives the plain text mail and the error mail 223E stored in the in-gateway mail box 223.

The error mail creating portion 224 generates the error mail 223E when notified from the transmission error detecting portion 213 of the transmission error that occurs when the in-gateway SMTP server 21 transmits the encrypted mail with the electronic signature to the SMTP server 3. The error mail creating portion 224 stores the error mail 223E in the in-gateway mail box 223.

The reception error detecting portion 225 detects the reception error that occurs when the in-gateway POP3 processing unit 22 receives the encrypted mail with the electronic signature from the POP3 server 4. The reception error detecting portion 225 notifies the error status setting portion 226 that the reception error has occurred.

The error status setting portion 226 sets an error status to error when notified from the reception error detecting portion 225 of the reception error that occurs when the in-gateway POP3 processing unit 22 receives the encrypted mail with the electronic signature from the POP3 server 4.

Even in a case where the error status setting portion 226 sets the error status to error, the client terminal 1 can still receive the mail at the time when the in-gateway mail box 223 stores the mail. At the time when the in-gateway box 223 does not store the mail in a case where the error status setting portion 226 sets the error status to error, the communication between the in-gateway POP3 processing unit 22 and the client device 1 becomes an error.

The transmitting/receiving client using the e-mail encryption system shown in FIG. 1 normally exists in plurals. In this case, the electronic signature providing portion 211 can store the transmission side private key of each transmitting client, and the encrypting portion 212 can store the public key of each receiver. Furthermore, the decrypting portion 221 can store the reception side private key of each receiving client, and the electronic signature detecting portion 222 can store the public key of each transmitter. Furthermore, the POP3 server 4 can include the in-server mail box for each receiving client, and the in-gateway POP3 processing unit 22 can include the in-gateway mail box for each receiving client.

Figure 2:
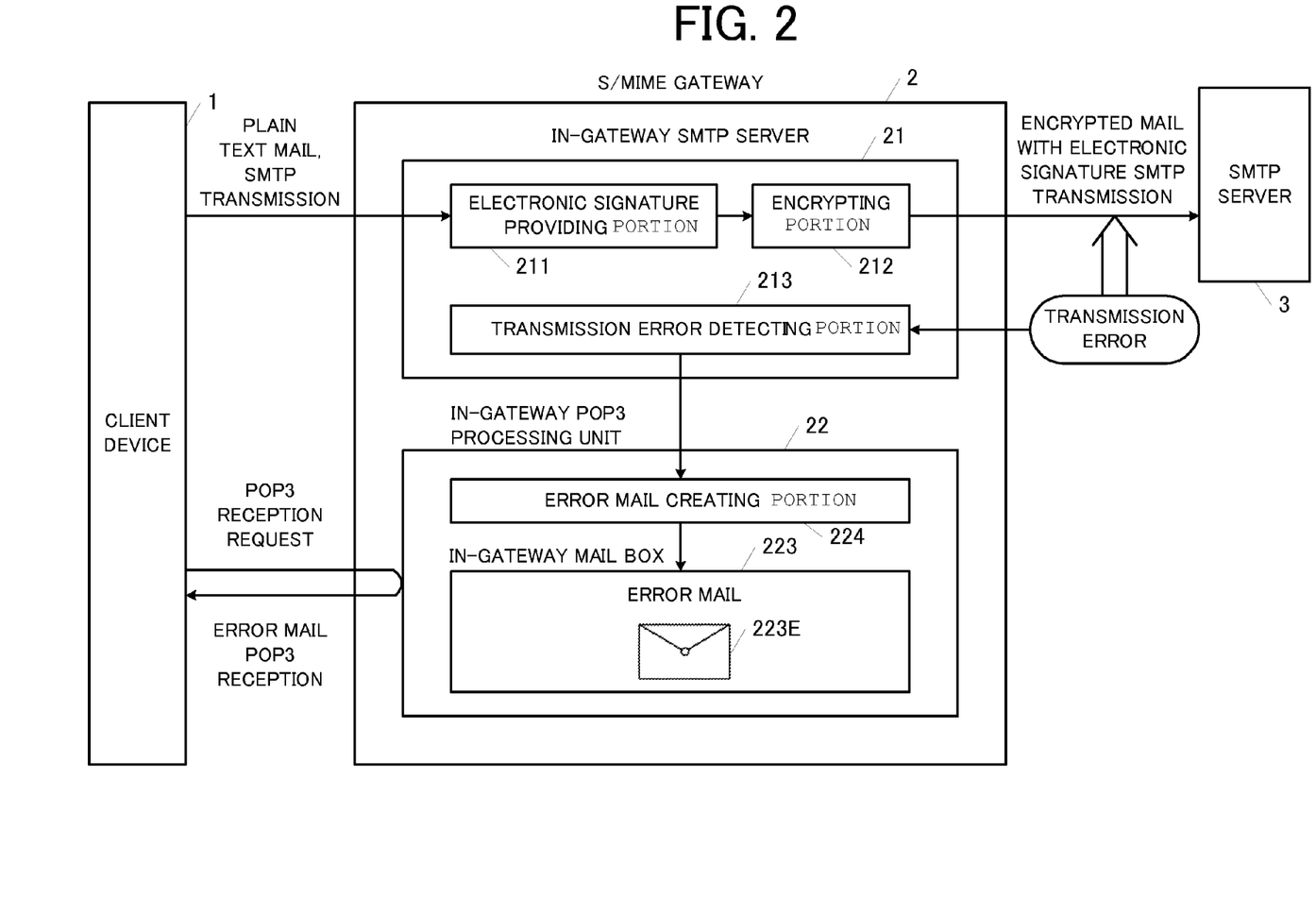
FIG. 2 is a block diagram showing a process flow when a transmission error occurs between an S/MIME (Secure/Multipurpose Internet Mail Extension) gateway and an SMTP (Simple Mail Transfer Protocol) server according to a preferred embodiment of the present invention.

The process flow for notifying the transmission error between the S/MIME gateway 2 and the SMTP server 3 to the client device 1 will now be described using FIG. 2. FIG. 2 is a block diagram showing a process flow when the transmission error occurs between the S/MIME gateway 2 and the SMTP server 3.

First, the client device 1 transmits the plain text mail to the in-gateway SMTP server 21. The in-gateway SMTP server 21 provides an electronic signature on the plain mail in the electronic signature providing portion 211 and encrypts the mail with the electronic signature in the encrypting portion 212. The in-gateway SMTP server 21 then transmits the encrypted mail with the electronic signature to the SMTP server 3.

Consider a case where transmission error of the encrypted mail with the electronic signature occurs between the in-gateway SMTP server 21 and the SMTP server 3. First, the transmission error detecting portion 213 detects the transmission error between the in-gateway SMTP server 21 and the SMTP server 3. The transmission error detecting portion 213 notifies the transmission error to the error mail creating portion 224. The error mail creating portion 224 then creates the error mail 223E for the transmission error and stores the same in the in-gateway mail box 223. The client device 1 makes a reception request to the in-gateway POP3 processing unit 22 and receives the error mail 223E.

The transmitting client is able to know about a transmission error, not only when the transmission error occurs between the client device 1 and the in-gateway SMTP server 21, but also when the transmission error occurs between the in-gateway SMTP server 21 and the SMTP server 3. Thus, the transmitting client is able to safely use the e-mail encryption system.

Figure 3:
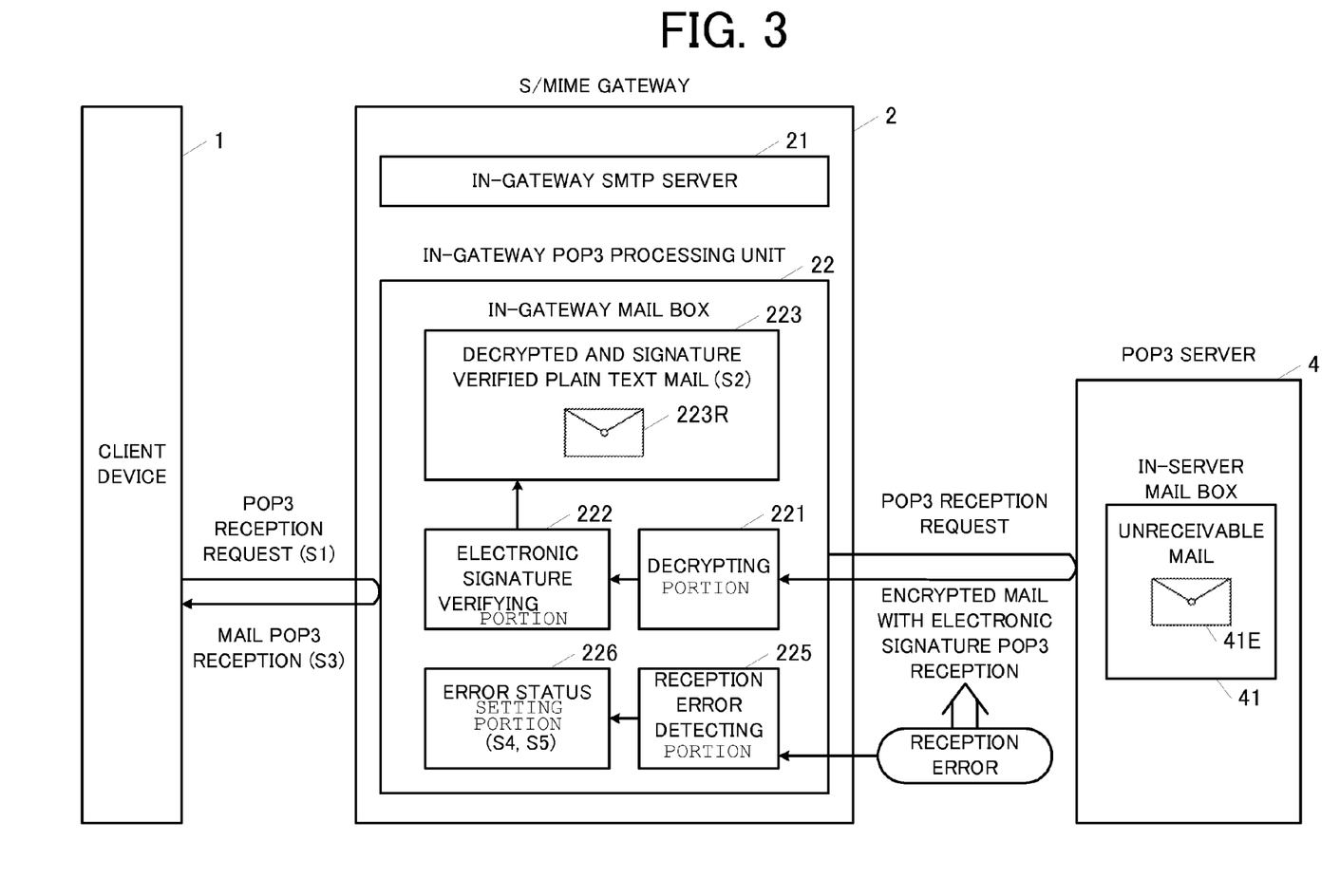
FIG. 3 is a block diagram showing a process flow when a reception error occurs between the S/MIME gateway and a POP3 (Post Office Protocol version 3) server according to a preferred embodiment of the present invention.
Figure 4:
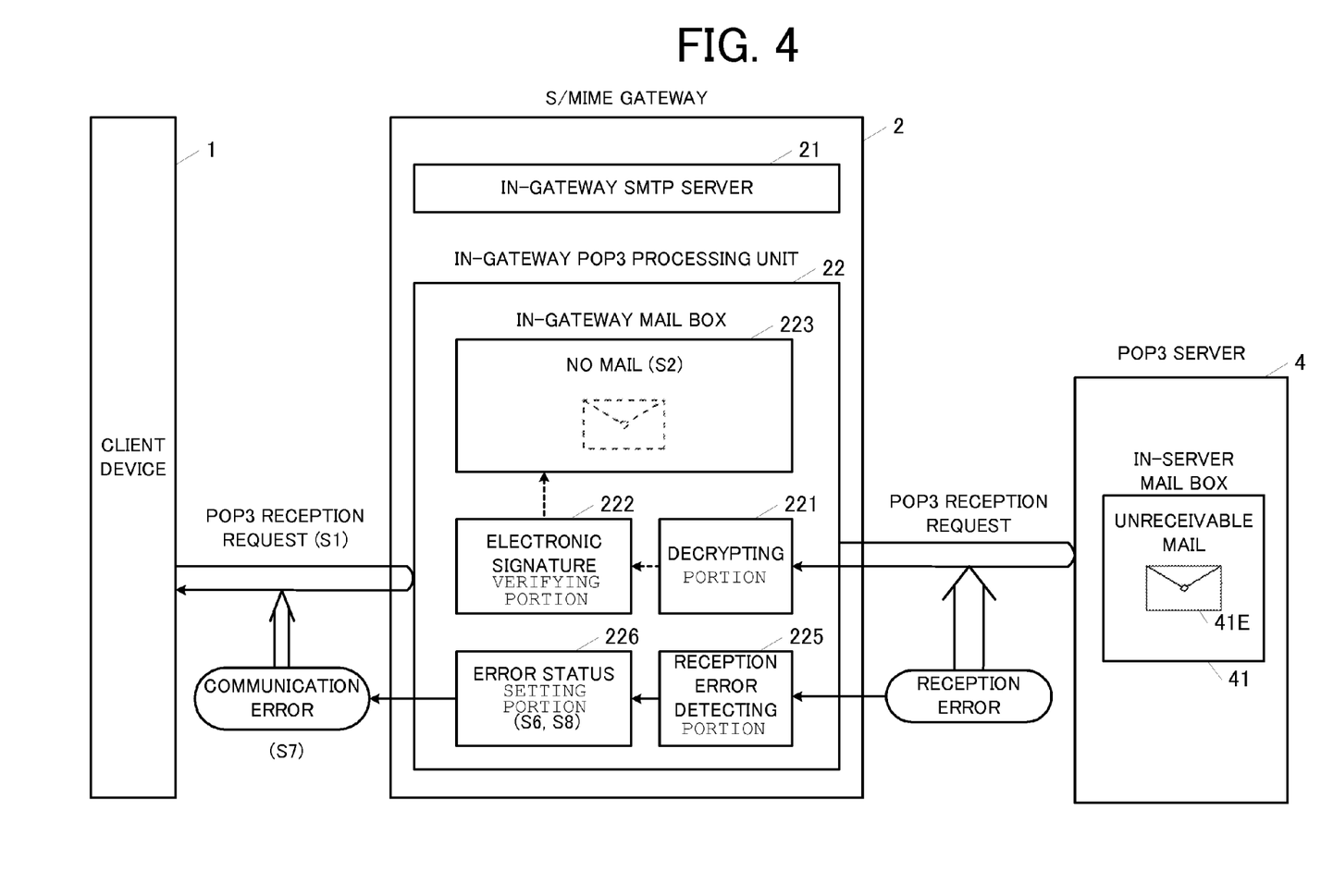
FIG. 4 is a block diagram showing a process flow when the reception error occurs between the S/MIME gateway and the POP3 server according to a preferred embodiment of the present invention.
Figure 5:
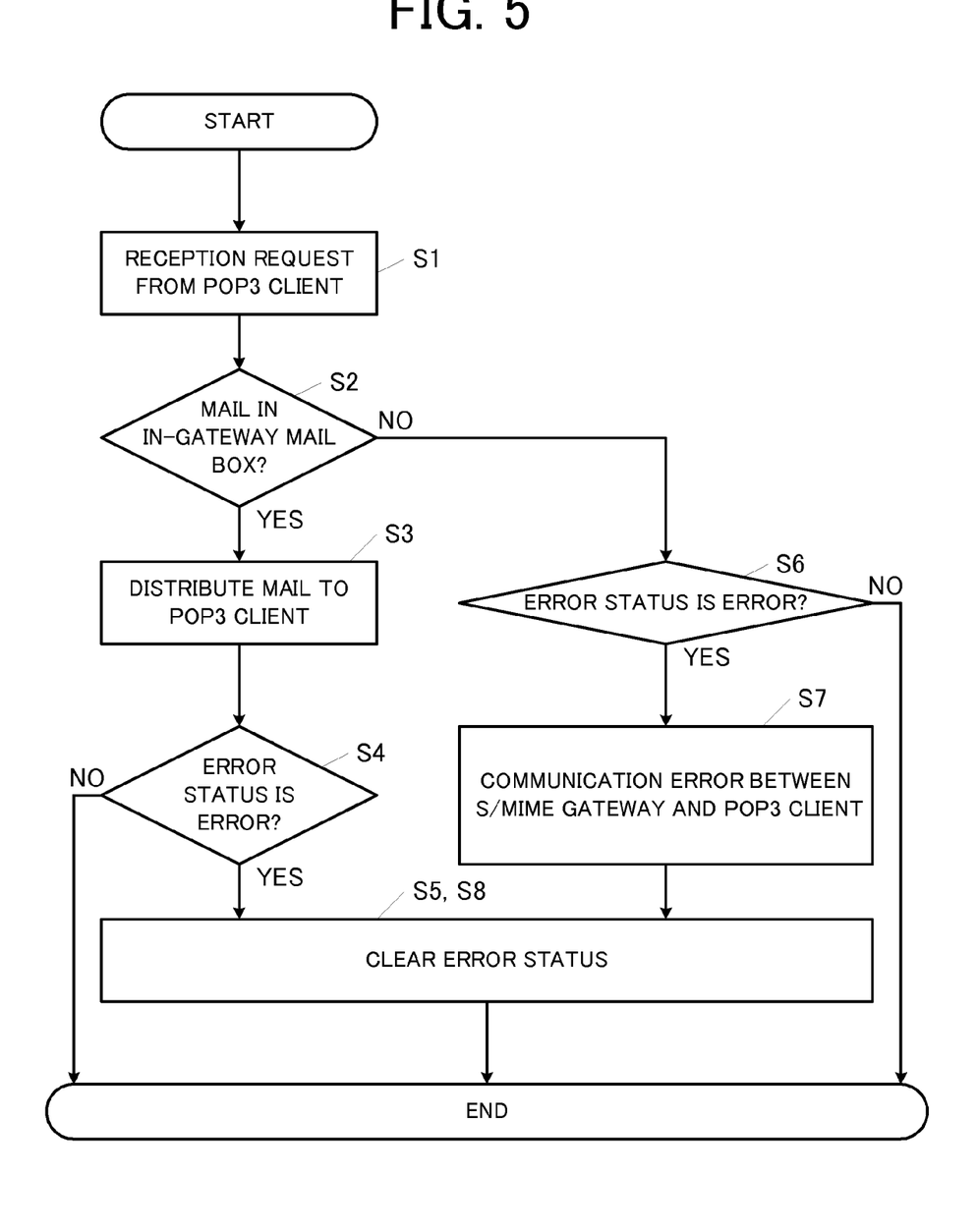
FIG. 5 is a flowchart showing a process flow when the reception error occurs between the S/MIME gateway and the POP3 server according to a preferred embodiment of the present invention.

The process flow the S/MIME gateway 2 performs on the client device 1 when the reception error occurs between the S/MIME gateway 2 and the POP3 server 4 will be described using FIGS. 3 to 5. FIGS. 3 and 4 are block diagrams showing a process flow where the reception error occurs between the S/MIME gateway 2 and the POP3 server 4. FIG. 5 is a flowchart showing a process flow when the reception error occurs between the S/MIME gateway 2 and the POP3 server 4. Steps S1-S8 shown in FIGS. 3 and 4 correspond to steps S1-S8 shown in FIG. 5.

Consider a case where the in-gateway mail box 223 stores the mail and a case where the in-gateway mail box 223 does not store the mail when reception request is made from the client device 1 to the in-gateway POP3 processing unit 22 (step S1). The process flow for such cases will be described below.

First, a case where the in-gateway mail box 223 stores the mail will be described using FIGS. 3 and 5. The reception error occurs between the in-gateway POP3 processing unit 22 and the POP3 server 4 when the in-gateway POP3 processing unit 22 makes a reception request to the POP3 server 4. However, the in-gateway POP3 processing unit 22 can receive some of the encrypted mails with the electronic signature stored in the in-server mail box 41 and cannot receive the other encrypted mails with the electronic signature stored in the in-server mail box 41 as unreceivable mail 41E.

The in-gateway POP3 processing unit 22 decrypts the encrypted mail with the electronic signature in the decrypting portion 221 and performs electronic signature verification on the mail with the electronic signature in the electronic signature verifying portion 222. The in-gateway mail box 223 stores the decrypted and signature verified mail 223R.

When reception request is made from the client device 1 to the in-gateway POP3 processing unit 22 (step S1), the mail 223R is stored in the in-gateway mail box 223 (Yes in step S2). The client device 1 then can receive the mail 223R from the in-gateway POP3 processing unit 22 (step S3). That is, the client device 1 can receive the mail 223R although a reception error has occurred between the in-gateway POP3 processing unit 22 and the POP3 server 4.

When the client device 1 receives the mail 223R, the error status setting portion 226 sets the error status to error (YES in step S4). The method for the error status setting portion 226 to set the error status to error will be described below. The reception error detecting portion 225 detects the reception error between the in-gateway POP3 processing unit 22 and the POP3 server 4. The reception error detecting portion 225 then notifies the reception error to the error status setting portion 226. The error status setting portion 226 sets the error status to error.

In step S4, the error status is set to error in the error status setting portion 226. The error status setting portion 226 then clears the error status because the client device 1 has already received the mail 223R (step S5). In other words, the communication between the in-gateway POP3 processing unit 22 and the client device 1 does not become an error although reception error occurs between the in-gateway POP3 processing unit 22 and the POP3 server 4. Thus, the receiving client can receive the mail 223R without being concerned about the reception error.

The error status cannot be set to error by the error status setting portion 226 in step S4. This is a case where reception error did not occur between the in-gateway POP3 processing unit 22 and the POP3 server 4. In this case, the error status setting portion 226 does not need to clear the error status, and the process flow for the client device 1 to make a reception request to the in-gateway POP3 processing unit 22 is terminated.

A case where the in-gateway mail box 223 does not store the mail will be described using FIGS. 4 and 5. The reception error occurs between the in-gateway POP3 processing unit 22 and the POP3 server 4 when the in-gateway POP3 processing unit 22 makes a reception request to the POP3 server 4. The in-gateway POP3 processing unit 22 cannot receive any of the encrypted mails with the electronic signature stored in the in-server mail box 41 as unreceivable mail 41E. The in-gateway mail box 223 thus does not store the mail.

When reception request is made from the client device 1 to the in-gateway POP3 processing unit 22 (step S1), the mail is not stored in the in-gateway mail box 223 (NO in step S2). Through a method similar to a case where the in-gateway mail box 223 stores the mail, the error status is set to error by the error status setting portion 226 (YES in step S6). The error status setting portion 226 makes the communication between the in-gateway POP3 processing unit 22 and the client device 1 as error on the POP3 protocol (step S7). Because the error status setting portion 226 has already made the communication as error, the error status setting portion 226 clears the error status (step S8).

The receiving client is able to know about the reception error, not only when reception error occurs between the client device 1 and the in-gateway POP3 processing unit 22, but also when reception error occurs between the in-gateway POP3 processing unit 22 and the POP3 server 4. Thus, the receiving client is able to safely use the e-mail encryption system.

The error status cannot be set to error by the error status setting portion 226 in step S6. This is a case where reception error did not occur between the in-gateway POP3 processing unit 22 and the POP3 server 4. In this case, the error status setting portion 226 does not need to make the communication between the in-gateway POP3 processing unit 22 and the client device 1 as error or clear the error status. The process flow for the client device 1 to make a reception request to the in-gateway POP3 processing unit 22 is then terminated.

In the present preferred embodiment, the transmitting client is able to know about the transmission error between the in-gateway SMTP server 21 and the SMTP server 3 in addition to the transmission error between the in-gateway SMTP server 21 and the client device 1. As a modification of the present preferred embodiment, the transmitting client is able to know about an encryption error. A process flow for the transmitting client to know about the encryption error in time of S/MIME conversion will now be described.

In the in-gateway SMTP server 21 shown in FIG. 2, an encryption error detecting portion is arranged as a component in addition to the transmission error detecting portion 213. The encryption error detecting portion detects encryption error at the time of S/MIME conversion. The encryption error detecting portion then notifies the encryption error to the error mail creating portion 224. The transmitting client is then able to know about the encryption error in time of S/MIME conversion, similar to the process flow for the transmitting client to know about the transmission error between the in-gateway SMTP server 21 and the SMTP server 3.

In the present preferred embodiment, the receiving client is able to know about the reception error between the in-gateway POP3 processing unit 22 and the POP3 server 4 when the communication between the in-gateway POP3 processing unit 22 and the client device 1 has made an error. As a modification of the present preferred embodiment, the receiving client is able to know about the reception error between the in-gateway POP3 processing unit 22 and the POP3 server 4 through an error mail similar to the error mail 223E shown in FIG. 2.

First, in the in-gateway POP3 processing unit 22 shown in FIG. 4, an error mail creating portion is arranged as a component in place of the error status setting portion 226. The error mail creating portion, which is a new component, and the error mail creating portion 224 shown in FIG. 2 can be the same error mail creating portion. The reception error detecting portion 225 detects reception error between the in-gateway POP3 processing unit 22 and the POP3 server 4. The reception error detecting portion 225 then notifies the reception error to the error mail creating portion or a new component. The receiving client is then able to know about the reception error, similar to the process flow for the transmitting client to know about the transmission error between the in-gateway SMTP server 21 and the SMTP server 3.

In the present preferred embodiment, the receiving client is able to know about the reception error between the in-gateway POP3 processing unit 22 and the POP3 server 4 in addition to the reception error between the in-gateway POP3 processing unit 22 and the client device 1. As a modification of the present preferred embodiment, the receiving client is able to know about a decryption error. A process flow for the receiving client to know about the decryption error in time of conversion from S/MIME to MIME will now be described.

In the in-gateway POP3 processing unit 22 shown in FIG. 4, a decryption error detecting portion is arranged as a component in addition to the reception error detecting portion 225. The error mail creating portion is also arranged as a component in addition to the error status setting portion 226.

The error mail creating portion, which is a new component, and the error mail creating portion 224 shown in FIG. 2 can be the same mail creating portion.

The decryption error detecting portion detects decryption error in time of conversion from S/MIME to MIME. The decryption error detecting portion then notifies the decryption error to the error mail creating portion or a new component. The receiving client is then able to know about the decryption error in time of conversion from S/MIME to MIME, similar to the process flow for the transmitting client to know about the encryption error in time of S/MIME conversion.

While the present invention has been described with respect to preferred embodiments thereof, it will be apparent to those skilled in the art that the disclosed invention can be modified in numerous ways and can assume many embodiments other than those specifically set out and described above. Accordingly, it is intended by the appended claims to cover all modifications of the present invention that fall within the true spirit and scope of the present invention.

What is claimed is:

1. A gateway device comprising:
    a converting portion arranged to convert a plain text mail received from a client device to an encrypted mail;
    a transmitting portion arranged to transmit the encrypted mail to a mail transmission server; and
    a transmission error notifying portion arranged to notify a transmission error to the client device when the transmission error in transmitting the encrypted mail occurs between the gateway device and the mail transmission server; wherein
    the transmission error notifying portion includes:
    a creating portion arranged to create a transmission error mail to provide notification of the transmission error and store the transmission error mail in a mail box corresponding to a source that is a notifying destination of the transmission error; and
    a distribution portion arranged to distribute the transmission error mail to the client device in response to a reception request from the client device.

2. A gateway device comprising:
    a converting portion arranged to convert an encrypted mail received from a mail reception server to a plain text mail;
    a storing portion arranged to store the plain text mail in a mail box corresponding to a destination; and
    a reception request responding portion arranged to distributing the plain text mail to a client device in response to a reception request from the client device; wherein
    the reception request responding portion includes a distributing portion arranged to distribute the plain text mail to the client device when at least one encrypted mail is received from the mail reception server even if a reception error occurs between the gateway device and the mail reception server;
    the gateway device further comprises:
        a reception error notifying portion arranged to notify a reception error to the client device when not even one encrypted mail is received from the mail reception server as a result of the reception error that occurs between the gateway device and the mail reception server; and
    the reception error notifying portion includes a notifying portion arranged to notify a reception error to the client device by making a communication between the gateway device and the client device.

3. The gateway device of claim 2, wherein the reception error notifying portion is arranged to notify the reception error to the client device by making the communication between the gateway device and the client device an error.

4. A method of controlling a gateway device comprising the steps of:
    converting a plain text mail received from a client device to an encrypted mail; transmitting the encrypted mail to a mail transmission server; and
    notifying a transmission error to the client device when the transmission error in transmitting the encrypted mail occurs between the gateway device and the mail transmission server; wherein
    the transmission error notifying step includes the steps of:
        creating a transmission error mail to provide notification of the transmission error and storing the transmission error mail to a mail box corresponding to a source which is a notifying destination of the transmission error; and
        distributing the transmission error mail to the client device in response to a reception request from the client device.

5. A non-transitory digital storage medium having electronically readable control signals stored thereon and being adapted to cooperate with a programmable computing device such that a method of claim 4 is performed.

6. A controlling method of a gateway device comprising the steps of:
    converting an encrypted mail received from a mail reception server to a plain text mail;
    storing the plain text mail in a mail box corresponding to a destination; and
    distributing the plain text mail to a client device in response to a reception request from the client device; wherein
    the distributing step includes a step of distributing the plain text mail to the client device when at least one encrypted mail is received from the mail reception server even if a reception error occurs between the gateway device and the mail reception server;
    the method further comprises the step of:
        a reception error notifying step of notifying a reception error to the client device when not even one encrypted mail is received from the mail reception server as a result of the reception error that occurs between the gateway device and the mail reception server; and
        the reception error notifying step includes a step of notifying a reception error to the client device by making a communication between the gateway device and the client device.

7. The gateway device of claim 3, wherein the error of the communication between the gateway device and the client device is an error with respect to a POP3 protocol.

* * * * *